Feb. 19, 1957   W. T. TEAGLE   2,781,889
ELEVATORS

Filed Oct. 29, 1954   6 Sheets-Sheet 1

Inventor
William Thomas Teagle
By
Attorneys

Feb. 19, 1957  W. T. TEAGLE  2,781,889
ELEVATORS
Filed Oct. 29, 1954  6 Sheets-Sheet 4

Inventor
William Thomas Teagle
By
Attorneys

Feb. 19, 1957 W. T. TEAGLE 2,781,889
ELEVATORS

Filed Oct. 29, 1954 6 Sheets-Sheet 5

Inventor
William Thomas Teagle
By
Attorneys

Feb. 19, 1957 W. T. TEAGLE 2,781,889
ELEVATORS
Filed Oct. 29, 1954 6 Sheets-Sheet 6

Inventor
William Thomas Teagle
By
Attorneys

United States Patent Office
2,781,889
Patented Feb. 19, 1957

2,781,889
ELEVATORS

William Thomas Teagle, Blackwater, Truro, England

Application October 29, 1954, Serial No. 465,692

Claims priority, application Great Britain
November 2, 1953

15 Claims. (Cl. 198—118)

This invention relates to portable elevators and particularly, though not exclusively, to those of the kind used, inter alia, for lifting material from ground level onto a lorry, trailer or like vehicle for transportation thereby, and, if the transported material is to be unloaded from the vehicle to a position which is higher than the vehicle, for lifting the material up to that position and discharging it there.

Hitherto, portable elevators designed for this purpose have been constructed so that the lower or receiving ends of their actual elevating mechanisms, which are supported in inclined positions, rest near the ground in order to reduce as much as possible the manual labour involved in loading the material onto the receiving end of the elevator. Such elevators, whilst being quite satisfactory for loading a vehicle, suffer a disadvantage when used in the unloading operation in that, the receiving end of the elevator being at ground level, the material has to be transferred manually from the vehicle onto the ground before it can be loaded onto the elevator for conveyance to the discharge point.

The object of the present invention, therefore, is to provide an improved portable elevator which overcomes this disadvantage.

According to the invention there is provided a portable elevator whose elevating mechanism is mounted in an inclined position upon a supporting structure which is adapted to enable the receiving end of said mechanism to be raised or lowered substantially independently of the discharge end thereof so that the elevating mechanism can be adjusted to operate at different receiving heights.

According to a further feature of the invention said supporting structure is also adapted to enable the discharge end of the elevating mechanism to be raised or lowered substantially independently of the receiving end thereof so that the elevating mechanism can be adjusted to operate at different discharge heights.

Reference will now be made to the accompanying drawings which illustrate a portable elevator constructed in accordance with the present invention, and in which.

In the embodiment illustrated the elevator includes an elevating mechanism 1 which is mounted in an inclined position upon a supporting structure that will be described later herein. The elevating mechanism comprises a central longitudinal tubular frame member 2 to which a number of transverse frame members 3 is welded at spaced intervals. Supported on these transverse frame members are four boards 4 which extend longitudinally of the elevating mechanism and which are adjustable transversely thereof. The inner of these boards are secured to the frame members 3 by bolts 5 which co-operate with slots 6 in said frame members to permit the lateral adjustment of the boards. The outer of the boards 4, and also two side boards 7, are fixed to right-angled brackets 8 which are slidable on the transverse frame members so as to effect the lateral adjustment of said outer boards and the side boards. The outer boards and the side boards are secured in their positions of adjustment by bolts 9 which cooperate with the slots in the transverse frame members. The boards are provided for guiding up the elevator the articles which are being conveyed thereby and for preventing the articles from falling off the elevating mechanism. The adjustability of the boards enables the elevator to deal with articles of varying sizes.

At each end of the central frame member 2 there is rotatably supported a sprocket wheel 10 around which passes an endless chain 11. The sprocket wheel at the receiving end of the elevating mechanism is carried by a forked member 12 formed with a tubular portion 12a which is slidably mounted in the lower end of the frame member 2 under the loading of a spring 13 so as to ensure a steady tension on the chain 11 and also prevent breakage of the chain in the event of its jamming. The member 12 is precluded from rotational displacement in the frame member by a bolt 12b which passes through two diametrically opposed holes in the frame member and through two diametrically opposed slots 12c cut longitudinally in the tubular portion 12a of the member 12. The sprocket wheel at the discharge end of the elevating mechanism is mounted on an axle 14 which is rotatably supported by a member 15 fixed to the upper end of the frame member 2 and by one of a pair of arms 16 fixed to the frame member 2 adjacent the upper end thereof.

Figure 9:
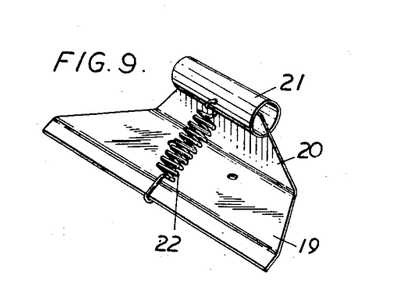
Fig. 9 is a perspective view of one form of means by which articles are conveyed up the elevator.
Figure 10:
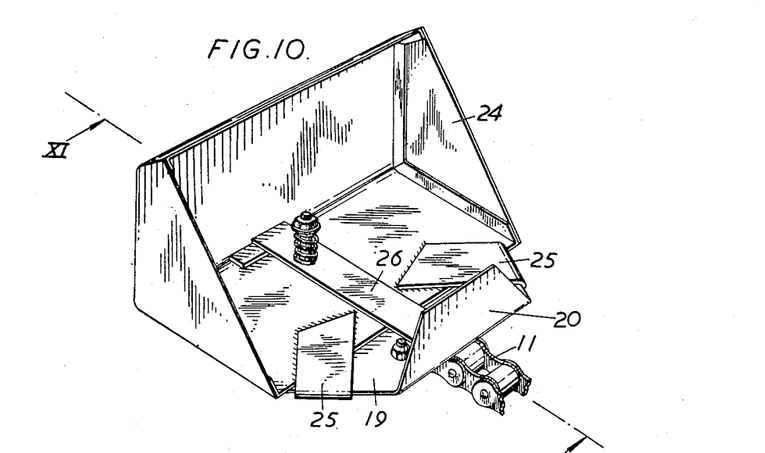
Fig. 10 is a perspective view of a bucket which is provided for attachment to the means shown in Fig. 9 when the elevator is handling bulk material.
Figure 11:
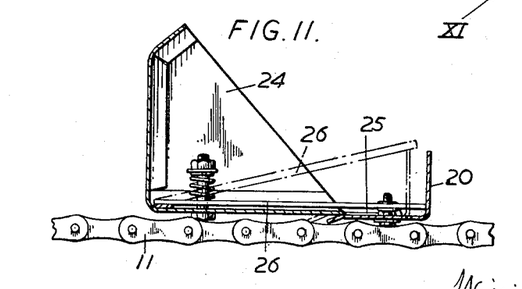
Fig. 11 is a sectional view taken on the line XI—XI of Fig. 10.

The chain 11 moves along the upper surface of the longitudinal frame member 2 between two parallel guide members 17 which are welded to said frame member. Fixed to the chain at spaced intervals and extending transversely thereof is a number of cross-pieces 18 for conveying the articles up the elevator. In the embodiment shown these cross-piece are of right-angled cross-section, each being formed with a base portion 19, which is bolted to the chain, and an upstanding portion 20. When the elevator is being used to handle sacks of grain or like material a short piece of tube 21 cut down one side (as shown in Fig. 9) is conveniently fitted over the edge of the upstanding portion of each of the cross-pieces 18 to prevent said edge from cutting into the sacks. The tube is held in position by a coil spring 22 anchored to the base portion of the cross-piece. In order to enable the elevator to handle loose grain or other bulk material a number of buckets is provided for attachment to the cross-pieces 18. Each of these buckets, of which one is shown at 24 in Figs. 10 and 11, is formed with two lugs 25 which are bent back so as to engage over the tapering side-edges of the base portion 19 of the cross-piece to which the bucket is to be attached. The bucket is locked to the cross-piece by a spring-loaded catch 26 which is attached to the bucket and which engages against thte inside of the upstanding portion 20 of the cross-piece. The bucket is detached from the cross-piece by lifting the catch 26 against its spring-loading sufficiently for it to clear the upper edge of the upstanding portion of the cross-piece as shown by dot-dash lines in Fig. 11. The bucket is then slid forward towards said upstanding portion so as to disengage the lugs 25 from the edges of the base portion of the cross-piece.

Figures 1, 7:
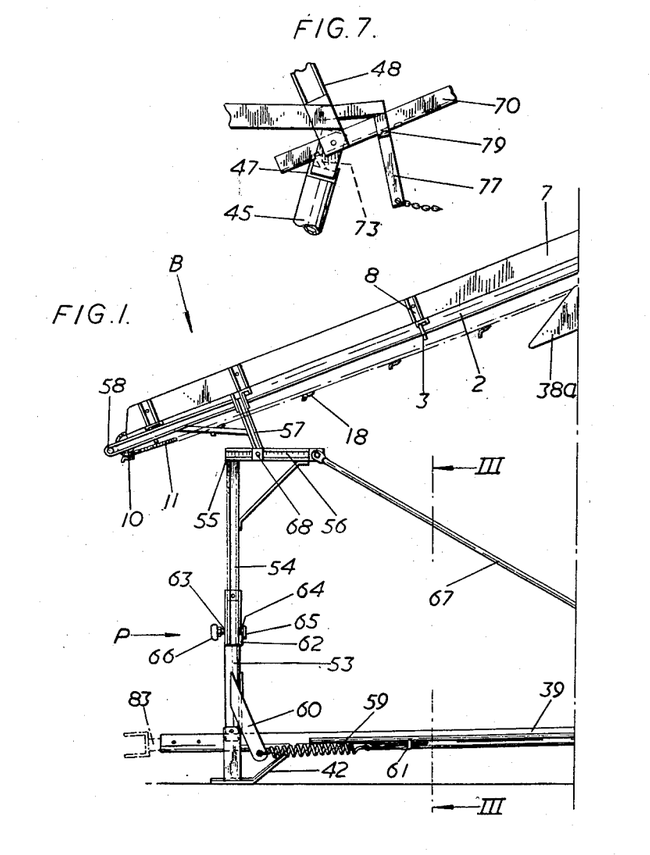
Figs. 1 and 1A together show a side elevation of the elevator with the receiving end of its elevating mechanism in a raised position.
Fig. 7 is an enlarged fragmentary side view of part of Fig. 1A.
Figure 4:
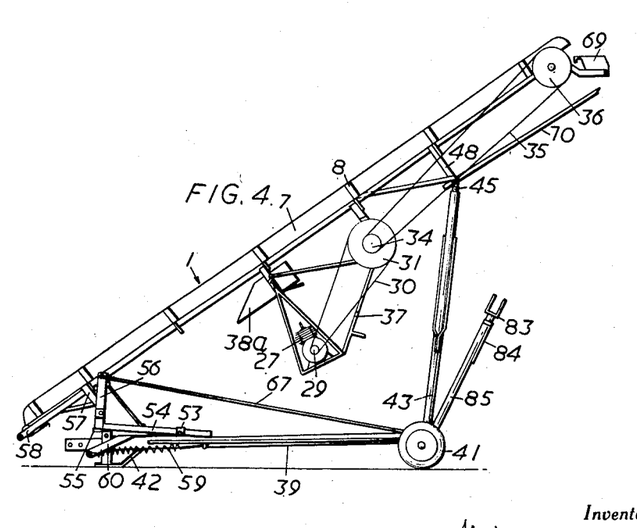
Fig. 4 is a diagrammatic side elevation of the elevator showing the elevating mechanism with its receiving end in a lowered position.
Figure 5:
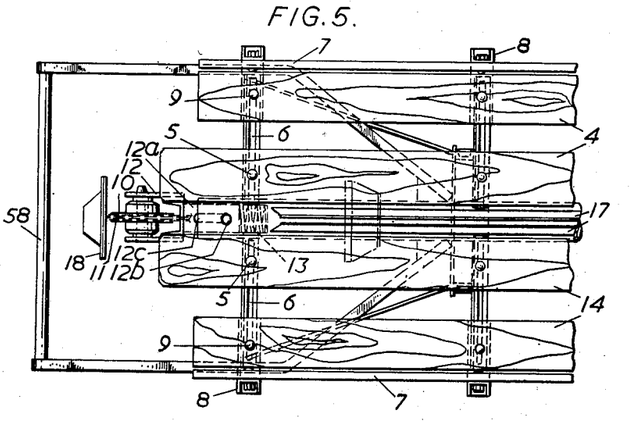
Fig. 5 is an enlarged fragmentary plan view of the receiving end of the elevating mechanism, looking in the direction of the arrow B in Fig. 1.
Figure 6:
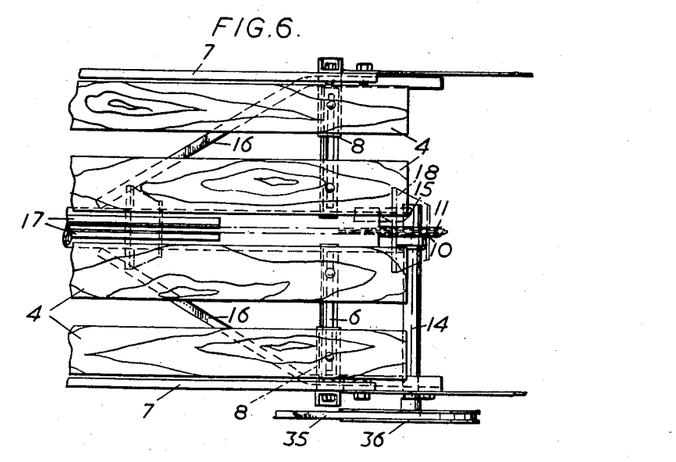
Fig. 6 is an enlarged fragmentary plan view of the discharge end of the elevating mechanism, looking in the direction of the arrow C in Fig. 1A.

The power unit for driving the elevating mechanism, for example a small internal combustion engine as indicated at 27 in Figs. 1 and 4, is mounted upon a cradle 28 which is pivotally suspended from one of the transverse frame members 3 in the central part of the elevating mechanism. The drive is taken from a pulley 29 on the shaft of the engine through a V-belt 30 to a second and larger pulley 31 mounted upon a shaft 32 which is supported by a shaft-hanger 33 attached to one of the transverse frame members between the engine and the upper end of the elevating mechanism. Rotatable with the pulley 31 is a smaller pulley 34 around which passes a second V-belt 35 which also passes around a large pulley 36 fixed on the axle 14 carrying the upper of the two sprocket wheels 10. By this arrangement of pulleys the required reduction in speed is effected between the engine and the chain 11. In order to enable the drive to be disengaged a toggle joint 37 is arranged between the engine cradle 28 and the shaft-hanger 33, the two levers of the joint being pivotally connected one to the cradle and the other to the shaft-hanger. The lever which is connected to the cradle is provided with a handle 38, and by applying an upward pressure to this handle the joint is broken (as shown in dot-dash lines in Fig. 1) and the cradle simultaneously swung towards the pulley 31 to relieve the tension on the belt 30 which can then be disengaged from the driving pulley 29. When the joint is in its straightened condition with the drive engaged it is locked over centre by the tension of the belt 30.

In order to prevent any pieces of the material which is being conveyed up the elevator from falling onto the engine a shield 38a is fitted above it.

The supporting structure upon which the elevating mechanism is mounted is preferably of welded tubular steel construction and includes a chassis consisting of a central longitudinal frame member 39 to one end of which is welded a transverse frame member 40. A wheel 41 is provided at each end of the transverse frame member and a skid 42 is fixed to the opposite end of the longitudinal frame member. Projecting upwardly from the wheeled end of the chassis are two legs 43 which converge towards their upper ends in the form of an inverted V. The lower ends of tthe legs are pivoted on the transverse frame member 40 so as to be movable in the longitudinal direction of the chassis. At their upper ends the two legs are welded to a short piece of steel tube 44 which forms a guide sleeve for a tubular pillar 45. The latter is slidable in the sleeve but is normally held firmly therein by a pin 46 which is passed through holes in the sleeve and the pillar. A number of such holes is provided up the pillar to enable it to be vertically adjusted in the sleeve. To the upper end of the pillar there is fixed a cross-bar 47 which is pivotally connected at its ends to two arms 48 that depend rigidly from one of the transverse frame members 3 at the head of the elevating mechanism.

For raising and lowering the pillar, and with it the discharge end of the elevating mechanism, there is provided a lever 49 which is pivotally connected to one end of the legs 43 by means of a link 50. The lever, which is of bifurcated form so as to straddle the pillar 45, is provided at its forked end with a pair of notches 51 which, by lifting the outer end of the lever as shown by dot-dash lines in Fig. 2, can be brought into engagement with a pin 52 inserted through one of the holes in the pillar below the sleeve 44. The other pin 46 is then removed from the sleeve and pillar, and by pulling down the outer end of the lever 49 the inner end thereof is swung upwardly to lift the pillar, and therefore the discharge end of the elevating mechanism, into the required position. They are then secured in this position by reinsertion of the pin 46 through the sleeve 44 and the pillar. An alternative method (not shown) of raising and lowering the pillar is by means of a hand-operated cable winch fixed to one of the legs 43, the cable leading from the drum of the winch over a pulley at the top of the legs and being attached to the lower end of the pillar.

At its receiving end the elevating mechanism is supported by an arrangement of toggle levers including a lower lever 53, preferably of tubular form, which is pivoted at its lower end to the longitudinal frame member 39 of the chassis, and a pair of upper levers 54 whose lower ends are disposed one on either side of the upper end of the lower lever and are pivotally connected thereto. To the upper ends of the upper levers there is fixed a cross-bar 55 to which, in turn, two horizontal arms 56 are secured, and to these arms there are pivotally connected two more arms 57 which depend rigidly from one of the transverse frame members 3 at the lower end of the elevating mechanism. When the toggle levers are folded down, as shown in Fig. 4, they support the receiving end of the elevating mechanism at a position near the ground so as to facilitate the loading of material from the ground onto the elevator. When the toggle levers are extended into a position wherein the upper levers 54 are in vertical or substantially vertical alignment with the lower lever 53, as shown in Fig. 1, they support the receiving end of the elevating mechanism at a distance above the ground such as to facilitate the loading of material from a lorry, trailer or like vehicle onto the elevator. The lower end of the elevating mechanism is lifted manually into its raised position, a handle bar 58 being provided to facilitate this. To assist the manual effort the toggle levers are biased towards their extended position by two coil springs 59 which are anchored to the longitudinal frame member 39 of the chassis and connected to the lower ends of two arms 60 that are fixed one to each side of the lower toggle lever 53 and project downwardly below the latter's pivotal connection with the longitudinal frame member 39. The anchorage of the springs, indicated at 61, is adjustable to enable their tension to be varied.

Figure 2:
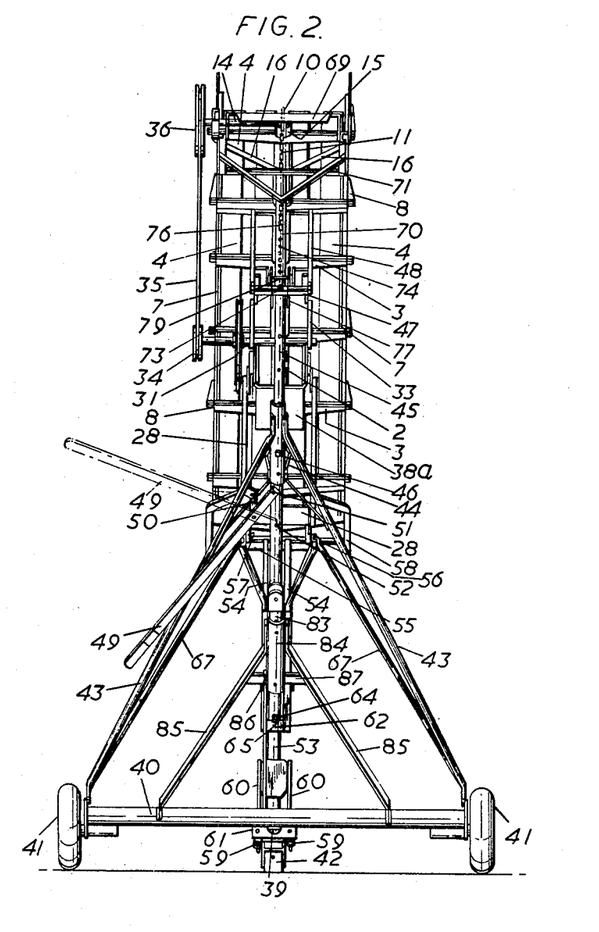
Fig. 2 is an end view looking in the direction of the arrow A in Fig. 1A.
Figure 3:
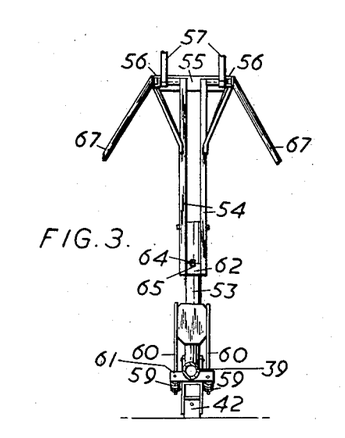
Fig. 3 is a fragmentary sectional view taken on the line III—III of Fig. 1.

In order to prevent the toggle levers, when opened out, from passing over centre, i. e. beyond their positions of vertical alignment, a bridge-piece 62 is fixed across the lower ends of the upper toggle levers so as to engage the upper end of the lower lever when the levers are fully extended. The levers are firmly secured in their extended position by a locking device 63 which consists of a pin 64 extending rotatably through a pair of holes in the lower toggle lever and formed at one end with a catch 65. By means of a finger-grip 66 provided at the other end of the pin, the catch can be turned into engagement with the bridge-piece 62 when the toggle levers are fully extended as shown in Figs. 1, 2 and 3. The levers are supported in this position by two struts 67 which are pivotally connected to the horizontal arms 56 at the upper end of the toggle levers and to the transverse frame member 40 of the chassis.

To bring the receiving end of the elevating mechanism into its low working position it is merely necessary to release the catch 65 and push in the direction of the arrow P in Fig. 1. This causes the toggle levers to collapse under the control of the springs 59 which counterbalance the weight of the elevating mechanism.

The raising or lowering of the lower end of the elevating mechanism pivots the mechanism about the axis of its pivotal connection with the pillar 45, but as this axis, which is indicated at 67 (Fig. 1), is near the mechanism's upper end there is relatively little movement at this end. Similarly, the adjustment of the height of the upper end of the elevating mechanism by raising or lowering the pillar 45 pivots the mechanism about the axis of its pivotal connection with the toggle levers, but as this axis, which is indicated at 68 (Fig. 1), is near the mechanism's lower end there is relatively little movement at this. Thus both ends of the elevating mechanism can be adjusted in height substantially independently of one another.

At the discharge end of the elevating mechanism there is provided a platform 69 for receiving the articles conveyed up the elevator and which is supported by means that are adjustable so that the platform always lies horizontally irrespective of variations in the angle of the elevating mechanism's inclination. These means include an inclined bar 70 to the upper end of which is fixed a U-shaped structure 71 that is pivotally connected at 72 to the downturned sides of the platform. At its lower end the bar is supported on the cross-bar 47 at the top of the pillar 45 and is located thereon by a peg 73 (Fig. 7) which is adapted for engagement with one of a series of holes 74 in the bar 70. The platform also has two arms 75 fixed to it which are pivotally connected to the ends of the arms 16 at the upper end of the elevating mechanisms. Below the bar 70 there is suspended a chain 76 one end of which is connected to the bar at a point adjacent its upper end and the other end of which is attached to a crank-shaped lever 77 that is pivoted at 78 (Fig. 1). This lever is formed intermediate its ends with a U-shaped portion 79 (Fig. 2) that freely surrounds the bar 70. To adjust the platform a downward pull is applied manually to the chain 76. This has the effect of swinging the lever 77 upwardly about its pivot 78 so that the portion 79 of the lever engages the underside of the bar 70 and lifts the latter off the peg 73. Then, by adjusting the bar backwards or forwards at its lower end, the platform is lowered or raised angularly about the upper end of the elevating mechanism to bring it into the horizontal or other desired position. The platform is secured in this position by re-engaging the bar with the peg 73.

Figures 1A, 8:
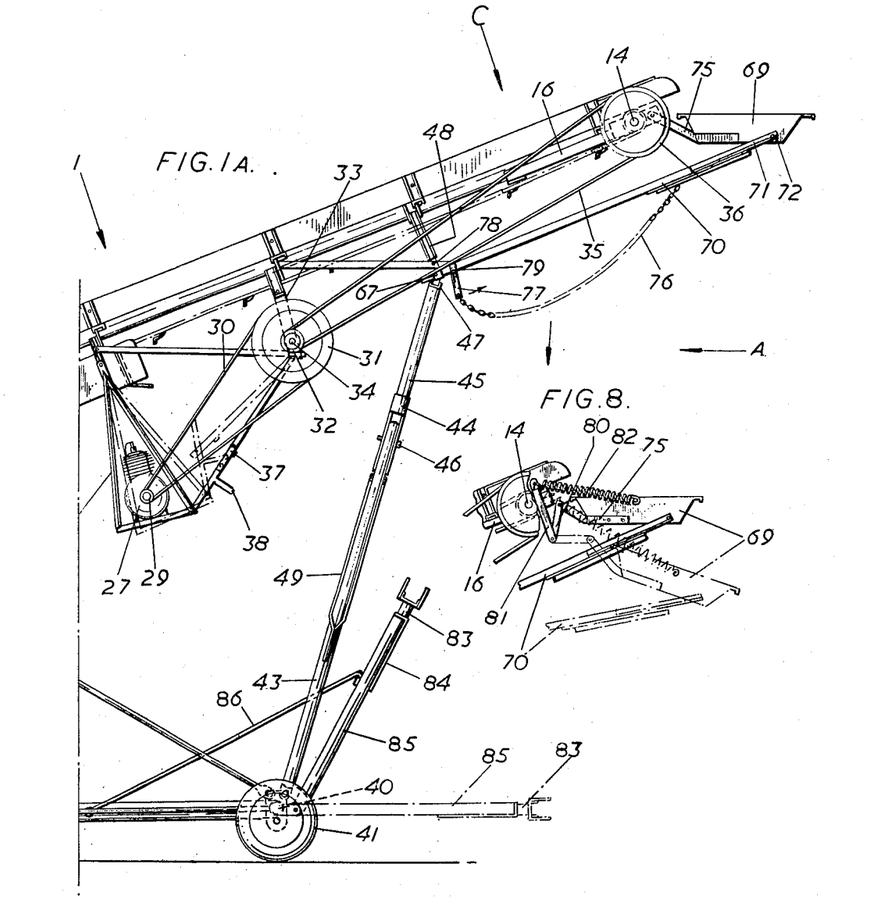
Fig. 8 is an enlarged fragmentary side view showing a modification of part of the elevator shown in Fig. 1A.

In Fig. 8 there is shown a modification of the means by which the platform is supported. In this modification the arms 75, instead of being pivoted on the fixed arms 16, are connected to the upper end of the elevating mechanism by an arrangement of folding levers comprising a first pair of levers 80 to whose upper ends the arms 75 are pivotally connected and whose lower ends are pivotally connected to a second pair of levers 81 projecting downwardly from the upper end of the elevating mechanism. The modification is completed by a pair of springs 82 which are anchored at the upper ends of the levers 81 and which are connected to the sides of the platform. The arrangement of this construction is such that, when an article is discharged by the elevating mechanism onto the platform, the weight of the article causes the platform to collapse away from the moving parts at the upper end of the elevating mechanism, as shown in dot-dash lines, and thus prevent the article from fouling the chain. In this collapsing movement of the platform the folding levers open out into an extended position, as shown by the dot-dash lines, and the bar 70 pivots downwardly about its point of support on the cross-bar 47. The holes 74 in the bar 70 are made so as to fit over the peg 73 with sufficient clearance to permit this pivotal movement of the bar. When the article is removed from the platform the latter is returned to its original position by the springs 82.

To enable the elevator to be towed behind a vehicle there is provided a tubular tow-bar 83 which can be fitted to either end of the chassis of the elevator. When used at the wheeled end of the chassis the tow-bar is fitted into a sleeve 84 fixed to the ends of two converging arms 85 which are pivoted on the transverse frame member 40 of the chassis. When not in use, the arms 85 are held up out of the way by a rod 86 which at one end is pivotally attached to the longitudinal frame member 39 of the chassis and at the other end is bent over for hooking on to a bar 87 fixed across the arms 85, as shown in full lines in Fig. 1. The towing position of the arms is shown in dot-dash lines. When used at the other end of the chassis the tow-bar is fitted into the end of the longitudinal frame member 39 as shown in dot-dash lines in Fig. 1.

One particular agricultural application of the invention is to the collection and stacking of the bales of straw which are left in the fields by the harvesting machinery during the harvesting of wheat and like crops. During the collection of the bales the elevator is towed behind the trailer on to which the bales are to be loaded, the tow being taken at the wheeled end of the elevator so that the discharge end of the elevating mechanism is over the trailer, and the receiving end of the mechanism being set to its low working position so that little manual effort is required in loading the bales onto the elevator. This loading can be done whilst the tractor, trailer and elevator are slowly moving along the lines of bales. When the trailer is loaded it is towed with the elevator to the stacking point, the tow this time being taken at the end of the elevator to which the skid is fitted so that the skid is lifted clear of the ground and the elevator travels on its wheels only. At the stacking point the receiving end of the elevating mechanism is raised to its high working position so that the bales of straw can be loaded straight from the trailer onto the elevator for conveyance onto the stack. The discharge end of the elevating mechanism can be adjusted to suit the level of the top of the stack as the latter is being built.

I claim:

1. A portable elevator comprising a supporting structure having a wheeled chassis, an elevating mechanism mounted in an inclined position upon said structure, means mounted at one end of said chassis providing a pivotal support for the discharge end of the elevating mechanism, and means mounted at the other end of the chassis for supporting the receiving end of said mechanism, the latter means comprising an arrangement of toggle levers adapted in a folded condition to support the receiving end of the elevating mechanism at a position near the ground, and in an extended condition to support the receiving end of said mechanism at a raised position a predetermined distance above the ground, and spring means connected to bias said toggle levers towards their extended position to counterbalance the weight of the receiving end of the mechanism during the raising and lowering thereof.

2. A portable elevator comprising a supporting structure having a wheeled chassis, an elevating mechanism mounted in an inclined position upon said supporting structure, means mounted at one end of said chassis providing a pivotal support for the discharge end of the elevating mechanism, said means being vertically adjustable to raise or lower the discharge end of said mechanism for varying the height thereof above the ground, and means mounted at the other end of the chassis for supporting the receiving end of said mechanism, the latter means comprising an arrangement of toggle levers adapted in a folded condition to support the receiving end of the elevating mechanism at a position near the ground, and in an extended condition to support the receiving end of said mechanism at a raised position a predetermined distance above the ground, spring means connected to bias said toggle levers towards their extended position so as to counterbalance the weight of the receiving end of the mechanism during the raising and lowering thereof, and strut means pivotally connected to the chassis and to said toggle levers to support the latter in their extended condition and form therewith a rigid support for the receiving end of the elevating mechanism in its raised position.

3. A portable elevator as defined in claim 2, wherein said toggle levers include a lower lever pivoted at its lower end to the chassis, a pair of upper levers having their lower ends arranged one on either side of the upper end of the lower lever and pivotally connected thereto and their upper ends pivotally connected with the receiving end of the elevating mechanism and with said supporting strut means, and a member fixed across the lower ends of said upper levers and adapted, upon extension of the toggle levers, to engage said lower lever so as to prevent the toggle levers from moving beyond their extended position.

4. A portable elevator as defined in claim 3, including a latch mounted on said lower lever and engageable with the cross-member on said upper levers so as to lock the toggle levers in their extended condition.

5. A portable elevator comprising a supporting structure having a wheeled chassis, an elevating mechanism mounted in an inclined position upon said supporting structure, means mounted at one end of said chassis for supporting the receiving end of the elevating mechanism, said means comprising an arrangement of toggle levers adapted in a folded condition to support the receiving end of said mechanism at a position near the ground, and in an extended condition to support the receiving end of said mechanism at a raised position a predetermined distance above the ground, spring means connected to bias said toggle levers towards their extended position to counterbalance the weight of the receiving end of the mechanism during the raising and lowering thereof, strut means pivotally connected to the chassis and to said toggle levers so as to support the latter in their extended condition and form therewith a rigid support for the receiving end of the elevating mechanism in its raised position, and means mounted at the other end of said chassis for supporting the discharge end of the elevating mechanism, said latter means comprising a pillar pivotally connected at its upper end to the elevating mechanism, a sleeve pivotally supported on the chassis for mounting said sleeve, said pillar being vertically adjustable in said sleeve for raising and lowering the discharge end of the mechanism to vary the height thereof above the ground.

6. A portable elevator as defined in claim 5, wherein two legs are pivotally mounted on said chassis and converge upwardly from the chassis to form an inverted V-shaped structure and said sleeve is fixed to the upper ends of said legs.

7. A portable elevator as defined in claim 6, wherein said pillar is supported in said sleeve by a pin inserted through holes in the sleeve and the pillar, a number of such holes being spaced along the pillar to permit selective vertical adjustment thereof, and a lever for raising and lowering the pillar, said lever being pivotally connected by a link intermediate its ends to one of said legs and being engageable with a second pin inserted through a hole in the pillar.

8. A portable elevator comprising a supporting structure, an elevating mechanism mounted in an inclined position upon said supporting structure, said elevating mechanism including a central longitudinal frame member, a number of transverse frame members fixed thereto at spaced intervals, a plurality of boards supported on said transverse frame members and extending longitudinally of the mechanism, a sprocket wheel mounted at each end of said longitudinal frame member, an endless chain passing round said sprocket wheels, and means fixed to said chain at spaced intervals for conveying up the elevator the articles or material being handled thereby, and said supporting structure including a wheeled chassis, means mounted at one end of said chassis providing a pivotal support for the discharge end of the elevating mechanism, said latter means being vertically adjustable to raise or lower the discharge end of said mechanism for varying the height thereof above the ground, and means mounted at the other end of the chassis for supporting the receiving end of the elevating mechanism, said latter means comprising an arrangement of toggle levers adapted in a folded condition to support the receiving end of the elevating mechanism at a position near the ground, and in an extended condition to support the receiving end of said mechanism at a raised position a predetermined distance above the ground, and spring means connected to bias said toggle levers towards their extended position to counterbalance the weight of the receiving end of the mechanism during the raising and lowering thereof.

9. A portable elevator as defined in claim 8, wherein said longitudinal frame member is tubular and one of said sprocket wheels is supported by a member having a tubular portion slidably mounted in the adjacent end of the longitudinal frame member, and a spring connected between said frame member and said one sprocket wheel supporting member for maintaining said chain tight.

10. A portable elevator as defined in claim 8, wherein said conveying means comprise a plurality of cross-pieces of angular cross-section each formed with a base portion fixed to the chain and an upstanding portion, and a number of buckets adapted to be attached to said cross-pieces for the conveyance of bulk material, said buckets each being formed with lugs engageable over the edges of the base portion of the cross-piece and having a spring-loaded locking member engageable with the upstanding portion so as to secure the bucket to the cross-piece.

11. A portable elevator comprising a supporting structure having a wheeled chassis, an elevating mechanism mounted in an inclined position upon said supporting structure, means mounted at one end of said chassis providing a pivotal support for the discharge end of the elevating mechanism, said means being vertically adjustable to raise or lower the discharge end of said mechanism for varying the height thereof above the ground, and means mounted at the other end of the chassis for supporting the receiving end of said mechanism, the latter means comprising an arrangement of toggle levers adapted in a folded condition to support the receiving end of the elevating mechanism at a position near the ground, and in an extended condition to support the receiving end of said mechanism at a raised position a predetermined distance above the ground, and spring means connected to bias said toggle levers towards their extended position so as to counterbalance the weight of the receiving end of the mechanism during the raising and lowering thereof, a platform mounted at the discharge end of said elevating mechanism for receiving articles conveyed up the elevator, and said mounting comprising adjustable means for enabling the platform to be set horizontally irrespective of variations in the inclination of the elevating mechanism.

12. A portable elevator as defined in claim 11, wherein said platform is pivotally connected to the discharge end of the elevating mechanism, a supporting bar mounted in an inclined position beneath the elevating mechanism, said bar being pivotally connected at one end to the platform and being adjustably mounted at its other end for raising or lowering the platform angularly about the discharge end of the elevating mechanism.

13. A portable elevator as defined in claim 12, wherein said bar is mounted for pivotal movement in a vertical plane about its point of support and wherein the connection of the platform to the discharge end of the elevating mechanism comprises an arrangement of folding levers which are extensible to allow the platform, when an article is discharged onto it by the elevating mechanism, to swing downwardly on said bar away from the discharge end of the elevating mechanism under the weight of said article and thereby avoid fouling the moving parts of said mechanism, and spring means operably connected to said platform for returning the platform to its original position when relieved of the weight of the article.

14. A portable elevator comprising an elevating mechanism, a cradle pivotally suspended from said elevating mechanism, a power unit mounted upon said cradle, means transmitting drive from said power unit to said elevating mechanism, and a supporting structure for carrying said elevating mechanism in an inclined position, said supporting structure including a wheeled chassis, means mounted at one end of said chassis providing a pivotal support for the discharge end of the elevating mechanism, and means mounted at the other end of the chassis for supporting the receiving end of said mechanism, the latter means comprising an arrangement of toggle levers adapted in a folded condition to support the receiving end of the elevating mechanism at a position near the ground, and in an extended condition to support the receiving end of said mechanism at a raised position a predetermined distance above the ground, and spring means connected to bias said toggle levers towards their extended position so as to counterbalance the weight of the receiving end of the mechanism during the raising and lowering thereof.

15. A portable elevator as defined in claim 14, wherein said drive transmitting means includes a pulley and a belt running between the power unit and said pulley, and wherein a toggle joint is connected between said cradle of the power unit and said pulley for enabling the drive to be disengaged, said toggle joint being adapted when being broken to swing said cradle towards said pulley and thereby relieve the tension on said belt to permit disengagement thereof from the power unit.

References Cited in the file of this patent

UNITED STATES PATENTS

| | | |
|---|---|---|
| 442,751 | Stephan | Dec. 16, 1890 |
| 2,550,904 | Bernard | May 1, 1951 |
| 2,601,916 | Bobrowski | July 1, 1952 |
| 2,607,472 | Senstock | Aug. 19, 1952 |